United States Patent
Kundu et al.

(10) Patent No.: US 12,213,180 B2
(45) Date of Patent: Jan. 28, 2025

(54) RANDOM ACCESS CHANNEL CONFIGURATION IN TIME DOMAIN FOR NR IN UNLICENSED SPECTRUM

(71) Applicant: Apple Inc., Cupertino, CA (US)

(72) Inventors: Lopamudra Kundu, Aalborg (DK); Gang Xiong, Gistrup (DK); Yongjun Kwak, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 359 days.

(21) Appl. No.: 17/607,511

(22) PCT Filed: Apr. 30, 2020

(86) PCT No.: PCT/US2020/030728
§ 371 (c)(1),
(2) Date: Oct. 29, 2021

(87) PCT Pub. No.: WO2020/227011
PCT Pub. Date: Nov. 12, 2020

(65) Prior Publication Data
US 2022/0225422 A1   Jul. 14, 2022

Related U.S. Application Data

(60) Provisional application No. 62/843,077, filed on May 3, 2019.

(51) Int. Cl.
*H04W 74/0833* (2024.01)
*H04W 16/14* (2009.01)
*H04W 74/0808* (2024.01)

(52) U.S. Cl.
CPC ....... *H04W 74/0833* (2013.01); *H04W 16/14* (2013.01); *H04W 74/0808* (2013.01)

(58) Field of Classification Search
CPC ............ H04W 74/0833; H04W 16/14; H04W 74/0808
See application file for complete search history.

(56) References Cited

U.S. PATENT DOCUMENTS

| 2016/0080947 | A1* | 3/2016 | Watanabe | ............ H04W 16/30 370/254 |
| 2017/0367121 | A1* | 12/2017 | Wei | ....................... H04W 72/23 |
| 2018/0263059 | A1* | 9/2018 | Rosa | ....................... H04L 5/001 |
| 2019/0174550 | A1* | 6/2019 | Huang | ................... H04W 72/12 |

(Continued)

FOREIGN PATENT DOCUMENTS

| EP | 3627941 A1 | 3/2020 |
| WO | 2017136458 A1 | 8/2017 |

(Continued)

OTHER PUBLICATIONS

PCT Search Report dated Mar. 8, 2020 in connection with PCT Application No. PCT/US2020/030728.

(Continued)

*Primary Examiner* — Parth Patel
(74) *Attorney, Agent, or Firm* — Eschweiler & Potashnik, LLC

(57) ABSTRACT

Systems, methods, and circuitries are provided for adjusting random access channel occasions support operation in unlicensed spectrum. In one example, a method includes determining a set of preconfigured random access channel (RACH) occasions (ROs) that includes a plurality of successive ROs; deriving an set of adjusted ROs by inserting a time gap between ROs in the set of preconfigured ROs; and transmitting a physical random access channel (PRACH) preamble in at least one RO in the set of adjusted ROs.

13 Claims, 6 Drawing Sheets

(56) References Cited

U.S. PATENT DOCUMENTS

| | | | |
|---|---|---|---|
| 2019/0215864 A1* | 7/2019 | Yang | H04W 74/02 |
| 2019/0349998 A1* | 11/2019 | Bhattad | H04L 1/0013 |
| 2019/0357092 A1* | 11/2019 | Jung | H04W 36/0055 |
| 2019/0387546 A1* | 12/2019 | Li | H04L 27/26132 |
| 2020/0053670 A1* | 2/2020 | Jung | H04W 56/00 |
| 2020/0059878 A1* | 2/2020 | Huang | H04B 7/088 |
| 2020/0137806 A1* | 4/2020 | Islam | H04L 27/2607 |
| 2020/0146076 A1* | 5/2020 | Islam | H04W 72/21 |
| 2020/0296635 A1* | 9/2020 | Rastegardoost | H04W 72/23 |
| 2020/0374939 A1* | 11/2020 | Liu | H04W 74/0833 |
| 2021/0168859 A1 | 6/2021 | Yang | |
| 2021/0298088 A1* | 9/2021 | Qi | H04W 74/0833 |
| 2021/0400724 A1* | 12/2021 | Liu | H04W 74/0841 |
| 2022/0015120 A1* | 1/2022 | Qiu | H04W 72/1268 |
| 2022/0201766 A1* | 6/2022 | Gao | H04W 72/0453 |
| 2022/0225422 A1* | 7/2022 | Kundu | H04W 74/0833 |

FOREIGN PATENT DOCUMENTS

| | | | |
|---|---|---|---|
| WO | 2017194018 A1 | 11/2017 | |
| WO | 2017212456 A1 | 12/2017 | |
| WO | WO-2019104299 A1 * | 5/2019 | H04W 56/001 |

OTHER PUBLICATIONS

PCT Written Opinion dated Mar. 8, 2020 in connection with PCT Application No. PCT/US2020/030728.

3rd Generation Partnership Project; Technical Specification Group Radio Access Network; NR; Physical channels and modulation; (Release 15); 3GPP TS 38.211 V15.5.0; Mar. 2019.

3rd Generation Partnership Project; Technical Specification Group Radio Access Network; NR; Multiplexing and channel coding; (Release 15); 3GPP TS 38.212 V15.5.0; Mar. 2019.

3rd Generation Partnership Project; Technical Specification Group Radio Access Network; NR; Physical layer procedures for control; (Release 15); 3GPP TS 38.213 V15.5.0; Mar. 2019.

3rd Generation Partnership Project; Technical Specification Group Radio Access Network; NR; Radio Resource Control (RRC) protocol specification; (Release 15); 3GPP TS 38.331 V15.5.1; Apr. 2019.

3rd Generation Partnership Project; Technical Specification Group Radio Access Network; NR; Physical channels and modulation (Release 15); 3GPP TS 38.211 V15.5.0 (Mar. 2019); http://www.3gpp.org.

* cited by examiner

RANDOM ACCESS CHANNEL CONFIGURATION IN TIME DOMAIN FOR NR IN UNLICENSED SPECTRUM

CROSS REFERENCE TO RELATED APPLICATIONS

This application is a National Phase entry application of International Patent Application No. PCT/US2020/030728 filed Apr. 30, 2020, which claims priority to U.S. Provisional Patent Application No. 62/843,077 filed on May 3, 2019, entitled "ENHANCEMENTS TO RANDOM ACCESS CHANNEL OCCASION CONFIGURATION IN TIME DOMAIN FOR NR-UNLICENSED," which is incorporated herein by reference for all purposes.

BACKGROUND

One limiting factor in wireless innovation is the availability of spectrum. To mitigate this, the unlicensed spectrum has been an area of interest to expand the availability of LTE. In this context, one enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

The present disclosure is described with reference to the attached figures. The figures are not drawn to scale and they are provided merely to illustrate the disclosure. Several aspects of the disclosure are described below with reference to example applications/use cases for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

The channel access mechanism aspect is a fundamental building block for NR-unlicensed. The adoption of Listen-Before-Talk (LBT) in LTE (Long Term Evolution) based LAA (License Assisted Access) system facilitates achieving fair coexistence with neighboring systems sharing the unlicensed spectrum in addition to fulfilling the regulatory requirements. The LBT based channel access mechanism generally resembles the WLAN's Carrier Sense Multiple Access with Collision Avoidance (CSMA/CA) principles. Any node that intends to transmit in unlicensed spectrum first performs a channel sensing operation before initiating any transmission. An additional random back-off mechanism is adopted to avoid collisions when more than one node senses the channel as idle and transmits simultaneously.

To fulfill regulatory requirements and provide a global solution of unified framework, NR-based unlicensed access will also use LBT based channel access mechanisms. Due to LBT, the performance of uplink (UL) transmission, for example, the preamble transmission over physical random access channel (PRACH) can be impacted, while operating in unlicensed spectrum. LBT may need to be performed at the User Equipment (UE) side before PRACH preamble can be transmitted. The resource allocation scheme for PRACH in NR-licensed system, which does not need to cope with such channel access related contention, may not be sufficient for PRACH preamble transmission in unlicensed spectrum.

Described herein are systems, methods, and circuitries that adjust preconfigured ROs (e.g., consecutive ROs as per licensed spectrum NR) to cope with LBT in unlicensed spectrum.

Figure 1:
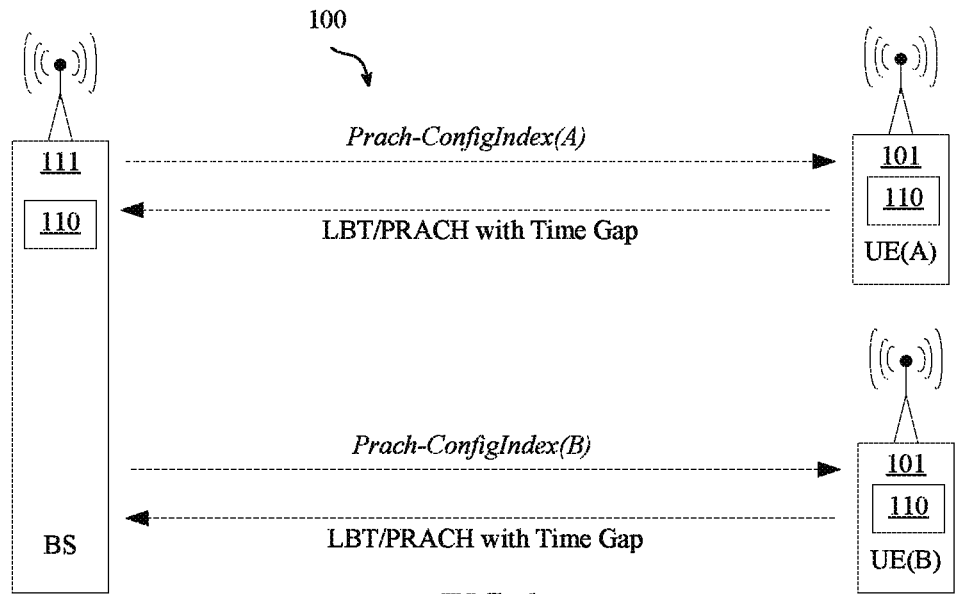
FIG. 1 is a block diagram illustrating exemplary random access channel (RACH) communication in a wireless communication network, according to various aspects disclosed.

FIG. 1 illustrates a wireless communication network 100 that includes a base station 111 (e.g., Next Generation Node B (gNB), evolved Node B (eNB), and so on) and two user equipment devices 101 (UE). An example wireless communication network is described in more detail with reference to FIG. 7. The base station 111 includes circuitry 110 (e.g., a baseband processor or one or more processors) that is configured to insert time gaps in a set of preconfigured ROs to generate a set of adjusted ROs that facilitate LBT prior to PRACH preamble transmission. The UEs 101 include analogous circuitry 110 that also inserts time gaps in a set of preconfigured ROs to generate a set of adjusted ROs that facilitate LBT prior to PRACH preamble transmission. When either the base station or the UE is described as performing some function or method, it is to be understood that it is the circuitry 110 causing the base station or UE to perform the function or method.

In NR, random access preambles are transmitted in time domain resources given by the higher layer parameter prach-ConfigurationIndex according to PRACH configuration tables defined in TS38.211 and depend on spectrum type (paired/FDD or unpaired/TDD) and frequency range (FR1 or FR2). FIG. 1 illustrates base station 111 transmitting prach-ConfigurationIndex to the UEs. However, the UE may already have received prach-ConfigurationIndex based on prior higher layer signaling from a different network entity. Each prach-ConfigurationIndex (0, 1, . . . ,255) indicates associated preamble format, system frame number or SFN ($n_{SFN}$), subframe number, starting symbol, number of PRACH slots within a subframe, number of time-domain PRACH occasions within a PRACH slot ($N_t^{RA,slot}$) and PRACH duration ($N_{dur}^{RA}$) which completely define the time domain resource allocation for PRACH.

Figure 1A:
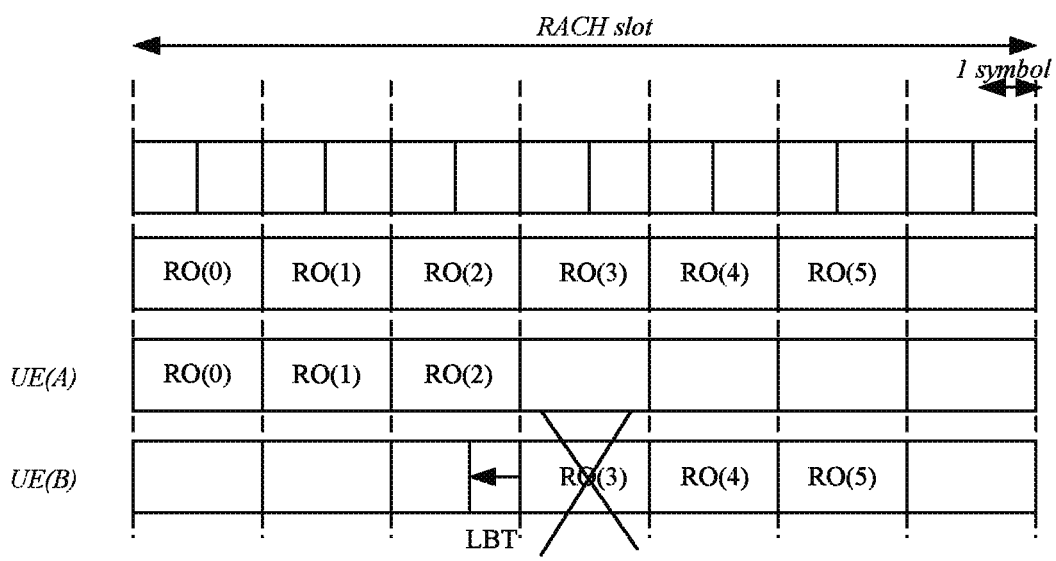
FIG. 1A is a timing diagram of an exemplary RACH slot in which a plurality of RACH occasions (ROs) are assigned.

As shown in FIGS. 1 and 1A, using prach-Configuration-Index, a number of consecutive or back-to-back RACH occasions (ROs) within a PRACH slot can be assigned to the UE, from which the UE would choose the first available RO for preamble transmission. For example, in FIG. 1A, RO(0)-RO(2) are assigned to UE(A) and RO(3)-RO(5) are assigned to UE(B).

In unlicensed spectrum, a UE may need to perform clear channel assessment (CCA) to sense the medium before accessing (in case the medium is idle) for preamble transmission. If consecutive ROs are assigned to different UEs for preamble transmission, the UE with RO(i) would perform LBT before the starting symbol for RO(i) and can be blocked by another UE's preamble transmission at RO(i−1). Thus, in the illustrated example, UE(B) may be blocked from transmitting PRACH in RO(3) due to the LBT for RO(3) overlapping with UE(A) preamble transmission in RO(2). In the following sections, enhancements related to time domain RO configuration are disclosed that can potentially alleviate the inter-UE LBT blocking in NR-unlicensed.

In one example, the time gap for CCA can be inserted before every RO that are preconfigured by prach-ConfigurationIndex in NR. The inserted time gap may be in units of an integer multiples of OFDM symbol duration, for example n symbol duration, or in units of time, e.g., m μs or a combination thereof (e.g. n symbols+m μs), where symbol duration is defined in accordance with numerology based on PRACH preamble. Alternatively, the inserted time gap may be in units of an integer multiples of RO duration for the corresponding PRACH preamble format.

Figure 2:
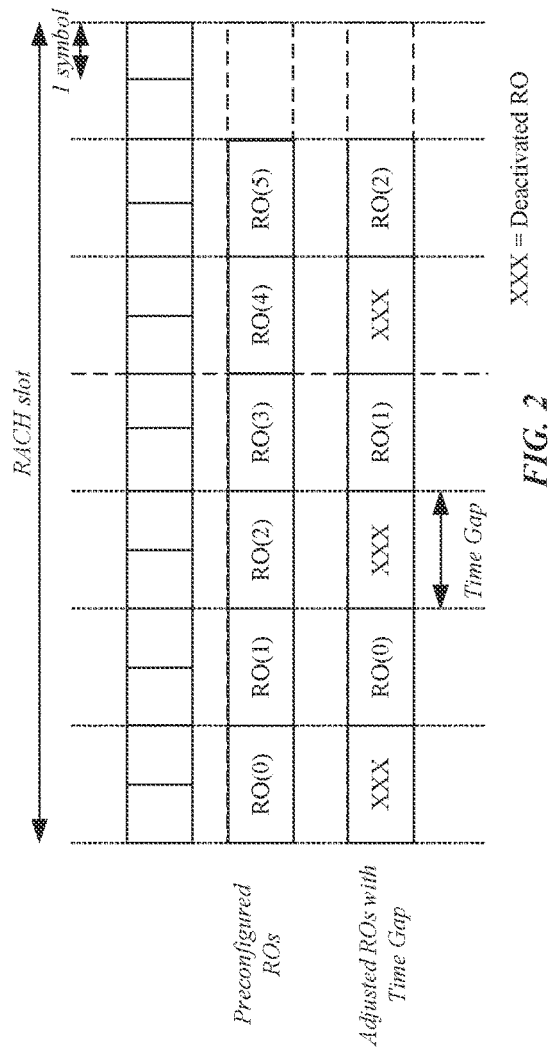
FIG. 2 is a timing diagram of an exemplary RACH slot in which a plurality of RACH occasions (ROs) are assigned and a set of adjusted ROs is derived, according to various aspects disclosed.

Referring to FIG. 2, a set of preconfigured ROs (e.g., as per the prach-ConfigurationIndex) and a set of adjusted ROs that reflect time gaps between the preconfigured ROs are illustrated. The set of preconfigured ROs include six consecutive or successive ROs that are adjacent one another in time. In other examples, the preconfigured ROs may have a different quantity or timing.

FIG. 2 illustrates the set of adjusted ROs being derived from the set of preconfigured ROs by appending a time gap of n symbol(s) (n≥1) at the beginning of i-th RO within a RACH slot by 'deactivating' x number of ROs ($x=\lceil n/N_{dur}^{RO}\rceil$) prior to i-th ROs. For example (i−1), (i−2), . . . (i−x)-th ROs can be deactivated, with one RO duration being $N_{dur}^{RO}$. The time gap can be configured by higher layer signaling (e.g. through prach-ConfigurationIndex) from an enhanced PRACH configuration table (for example, by adding an additional column to the existing NR PRACH configuration table indicating LBT gap to derive valid non-consecutive ROs from the predefined consecutive ROs used in NR). Alternatively, the time gap can be implicitly derived based on other parameters indicated by higher layer signaling (e.g. preamble subcarrier spacing, the LBT category to be used to access the channel for preamble transmission etc.). In this manner, non-consecutive adjusted ROs are determined from the PRACH configuration table corresponding to prach-ConfigurationIndex.

As one example, if preamble format A1 is configured by higher layer parameter prach-ConfigurationIndex, there can be 6 ROs within a RACH slot in NR, with a duration of 2 OFDM symbols per RO. If a time gap of 2 symbols is to be inserted in between ROs, every alternate RO within the set of 6 consecutive ROs in NR PRACH configuration table can be 'deactivated'. In other words, if the RO indices are RO(0), RO(1), . . . , RO(5), then either the ROs with odd indices (i.e. RO(1), RO(3), RO(5)) are 'deactivated' and ROs with even indices (i.e. RO(0), RO(2), RO(4)) are used, or vice versa, as illustrated in FIG. 2.

In another option, a scaling factor and/or offset may be configured by higher layers as part of PRACH configuration to indicate a subset of ROs is deactivated. The scaling factor may be a fractional value, for example, 1/N where N is positive integer number. For instance, when scaling factor=½, this indicates half of ROs are deactivated. An offset may indicate the starting deactivated RO. For instance, assuming scaling factor=½, offset=1, and PRACH format A1 with 6 ROs in a slot, which indicates that RO #1, 3, 5 are deactivated.

Figure 3:
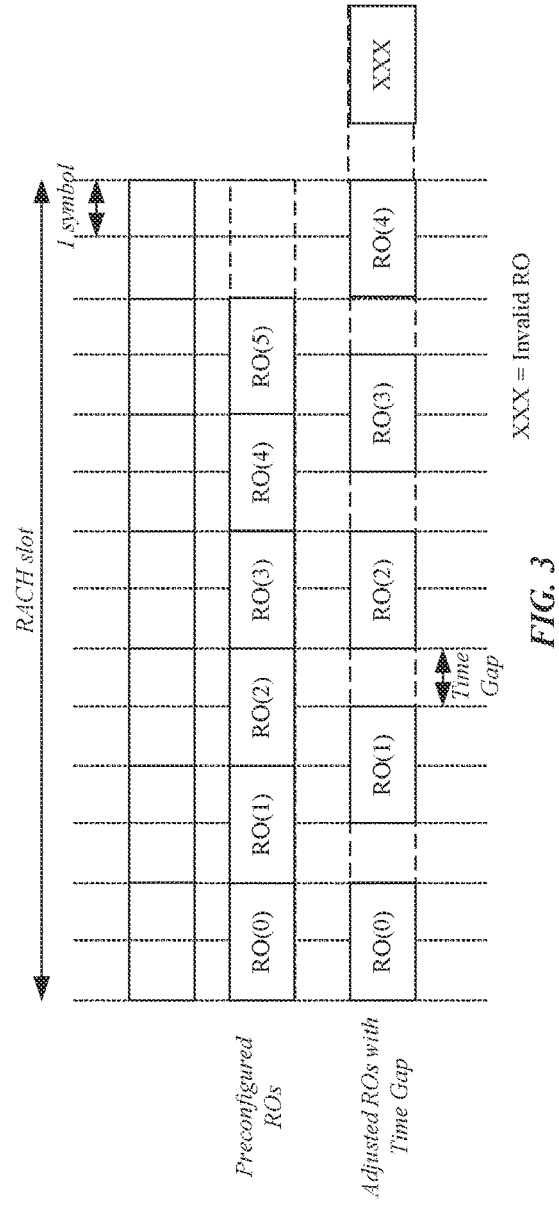
FIG. 3 is a timing diagram of an exemplary RACH slot in which a plurality of ROs are assigned and a set of adjusted ROs is derived, according to various aspects disclosed.

Referring to FIG. 3, a set of preconfigured ROs (e.g., as per the prach-ConfigurationIndex) and a set of adjusted ROs that reflect time gaps between the preconfigured ROs are illustrated. The set of preconfigured ROs include six consecutive or successive ROs that are adjacent one another in time. In other examples, the preconfigured ROs may have a different quantity or timing.

FIG. 3 illustrates the set of adjusted ROs being derived from the set of preconfigured ROs by appending a time gap of n symbol(s) (n≥1) at the beginning of i-th RO (i>0) within a RACH slot by configuring an offset of 'x' symbols by higher layer signaling. The offset is used by the UE (or base station) to implicitly determine the separation between successive ROs within a slot and accordingly could shift ROs (configured in PRACH configuration table for NR corresponding to the row index indicated by prach-ConfigurationIndex) with respect to RO(0) or the $1^{st}$ RO within a RACH slot. If a shifted RO crosses the RACH slot boundary, that RO is not considered as a valid RO. If a shifted RO is not inside the duration of the original RACH occasions, that RO is not considered as a valid RO.

As one example, as shown in FIG. 3, if preamble format A1 is configured by higher layer parameter prach-ConfigurationIndex, there can be 6 ROs within a RACH slot in NR, with a duration of 2 OFDM symbols per RO. If a time gap of 1 symbol is inserted in between ROs, there will be 5 ROs available per RACH slot, with RO(1) to RO(4) shifted with respect to RO(0). Shifted RO(5) crosses the RACH slot boundary and hence is not considered (e.g., allocated) as a valid RO.

In the same example, if last two OFDM symbols need to be empty for other purposes (e.g., UL control channels), there will be 4 ROs available per RACH slot, with RO(1) to RO(3) shifted with respect to R(0). Shifted RO(4) and RO(5) are not inside the original duration of the ROs and hence would not be considered (e.g., allocated) as valid ROs.

Figure 4:
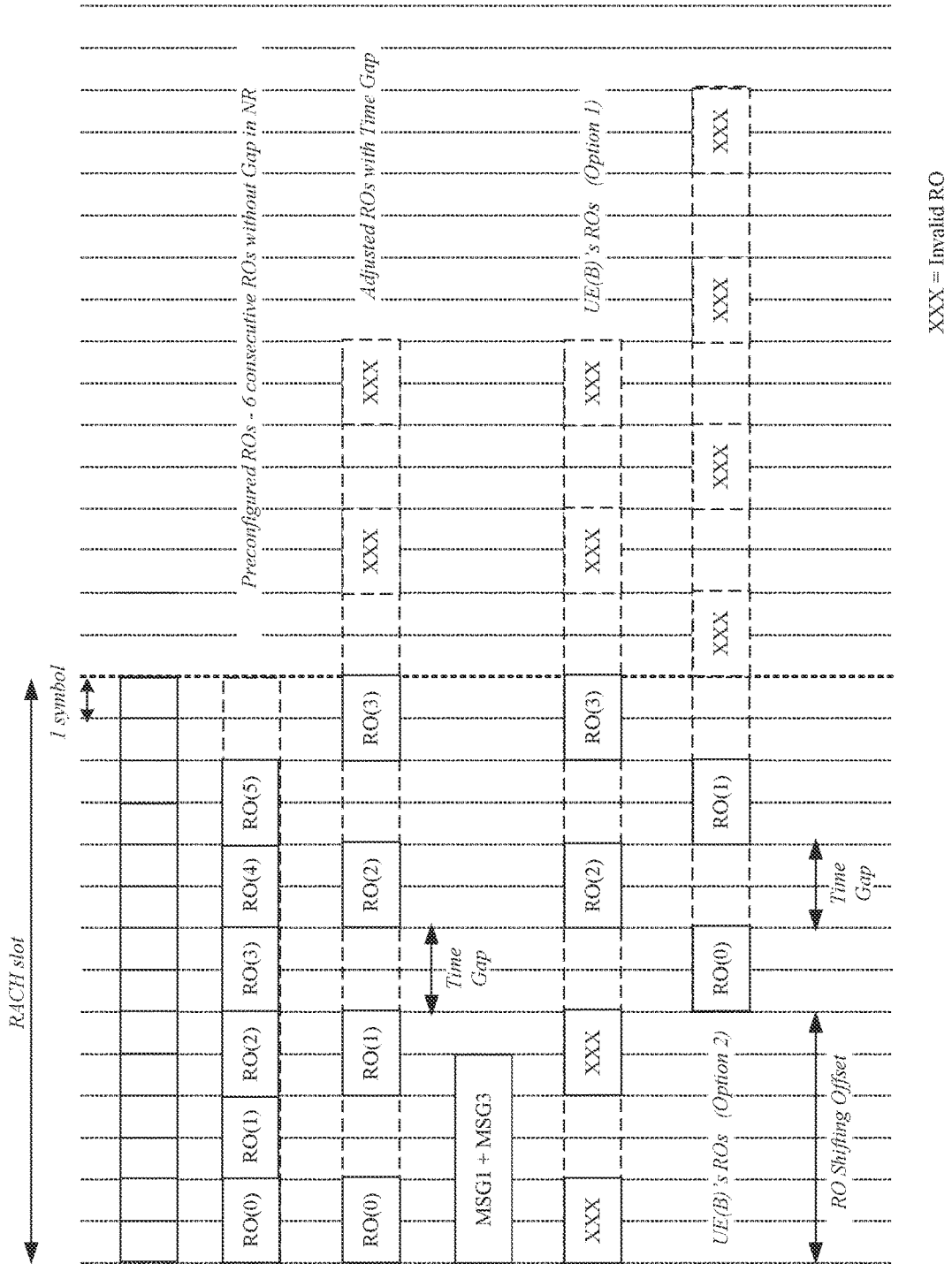
FIG. 4 is a timing diagram of an exemplary RACH slot in which a plurality of ROs are assigned and a set of adjusted ROs is derived, according to various aspects disclosed.

Referring to FIG. 4, a set of preconfigured ROs (e.g., as per the prach-ConfigurationIndex) and a set of adjusted ROs that reflect time gaps between the preconfigured ROs are illustrated. The set of preconfigured ROs include six consecutive or successive ROs that are adjacent one another in time. In other examples, the preconfigured ROs may have a different quantity or timing. In the illustrated example, the time gap between successive ROs within a RACH slot may be different.

For example, Two UEs may be configured with consecutive ROs within a RACH slot such that UE(A) is configured with 2-step RACH procedure (i.e., preamble (MSG1) is transmitted along with TDM'd PUSCH (MSG3) into a single message), while UE(B) is configured with either a 2 step or 4-step RACH procedure (i.e., MSG1 or preamble only transmission in the RO). The first available RO for UE(B) may need to be shifted by n number of symbols with respect to the $1^{st}$ available RO of UE(A), while the time gap between the consecutive other ROs may be the same for both the UEs and can be less than n symbols as illustrated by option 2 in FIG. 4.

Alternatively, UE(B) may be allocated the same ROs as UE(A), in which case the ROs overlapping in time with the message duration (transmitted by UE(A)) will not be available for UE(B) (i.e. UE(B)'s LBT will fail on these ROs), as shown in option 1 of FIG. 4.

In another example, a time gap for CCA can be inserted before every RO by inserting a guard period (GP) (e.g. for formats A1, A2, A3) or extending guard period (e.g. for formats B or formats C) at the end of preamble transmissions, so that the GP of preamble transmitted in RO(i−1) can incorporate the LBT gap for preamble scheduled in RO(i).

In another example, a time gap can be created in between successive ROs by puncturing/truncating one or more than one repeated preamble transmissions within a RO. As one example, preamble format B1 has time domain structure as cyclic prefix (CP)+sequence+sequence+GP. In order to create time gap in between ROs, the last sequence transmission can be punctured so that the gap (CP+sequence+GP) can be used for LBT/CCA. An additional time gap can be configured on top of puncturing as well, if a longer CCA gap is desired (depending on LBT category, priority class and contention window size).

Following are several flow diagrams outlining example methods. In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, the term select when used with reference to some entity or value of an entity is to be construed broadly as encompassing any manner of determining the entity or value of the entity from amongst a plurality or range of possible choices. For example, the term select is to be construed to encompass accessing and reading memory (e.g., lookup table, register, device memory, remote memory, and so on) that stores the entities or values for the entity and returning one entity or entity value from amongst those stored. The term select is to be construed as applying one or more constraints or rules to an input set of parameters to determine an appropriate entity or entity value. The term select is to be construed as broadly encompassing any manner of choosing an entity based on one or more parameters or conditions.

As used herein, the term derive when used with reference to some entity or value of an entity is to be construed broadly. "Derive" should be construed to encompass accessing and reading memory (e.g., lookup table, register, device memory, remote memory, and so on) that stores some initial value or foundational values and performing processing and/or logical/mathematical operations on the value or values to generate the derived entity or value for the entity. "Derive" should be construed to encompass computing or calculating the entity or value of the entity based on other quantities or entities. "Derive" should be construed to encompass any manner of deducing or identifying an entity or value of the entity.

Figure 5:
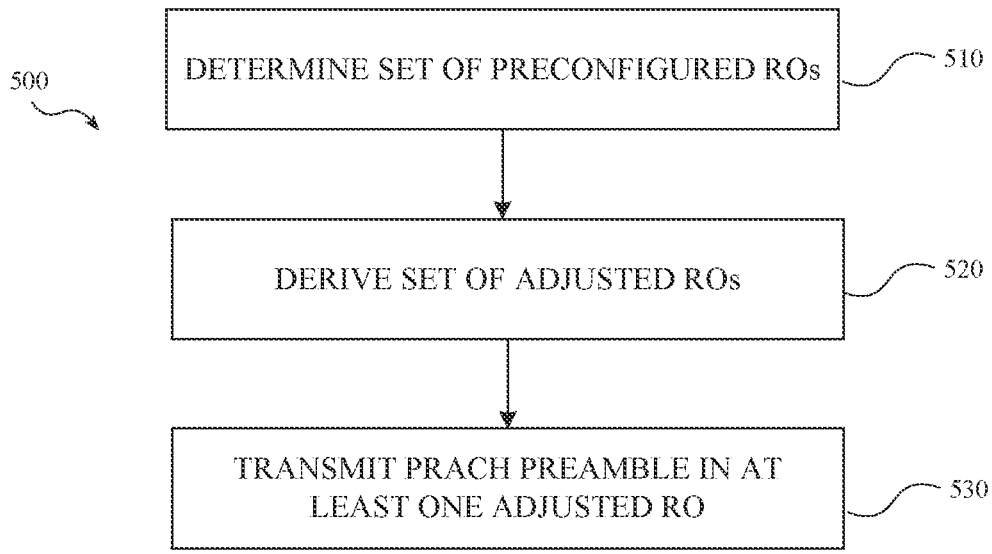
FIG. 5 is a flow diagram illustrating an exemplary method for performing RACH communication at a UE, according to various aspects disclosed.

FIG. 5 depicts a flow diagram outlining a method 500 for performing RACH communication, at a UE. The method includes, at 510, determining a set of preconfigured ROs, wherein the set of preconfigured ROs includes a plurality of successive ROs. The method includes, at 520, deriving an adjusted set of ROs by inserting a time gap between ROs in the set of preconfigured ROs. The method includes, at 530, transmitting a physical random access channel (PRACH) preamble in at least one adjusted RO in the adjusted set of ROs.

Figure 6:
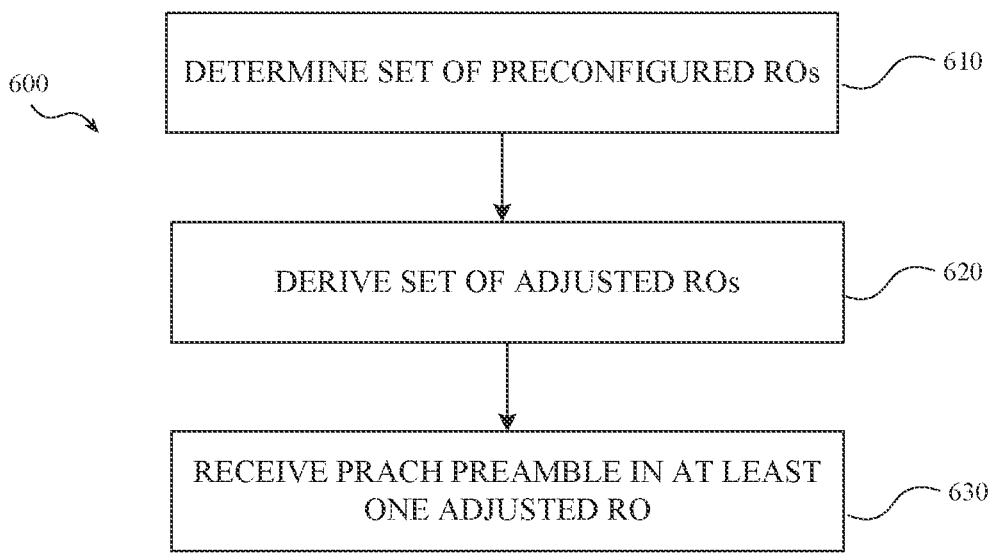
FIG. 6 is a flow diagram illustrating an exemplary method for performing RACH communication at a base station, according to various aspects disclosed.

FIG. 6 depicts a flow diagram outlining a method 600 for performing RACH communication, at a base station. The method includes, at 610, determining a set of preconfigured ROs, wherein the set of preconfigured ROs includes a plurality of successive ROs. The method includes, at 620, deriving an adjusted set of ROs by inserting a time gap between ROs in the set of preconfigured ROs. The method includes, at 630, receive a physical random access channel (PRACH) preamble in at least one adjusted RO in the adjusted set of ROs.

Figure 7:
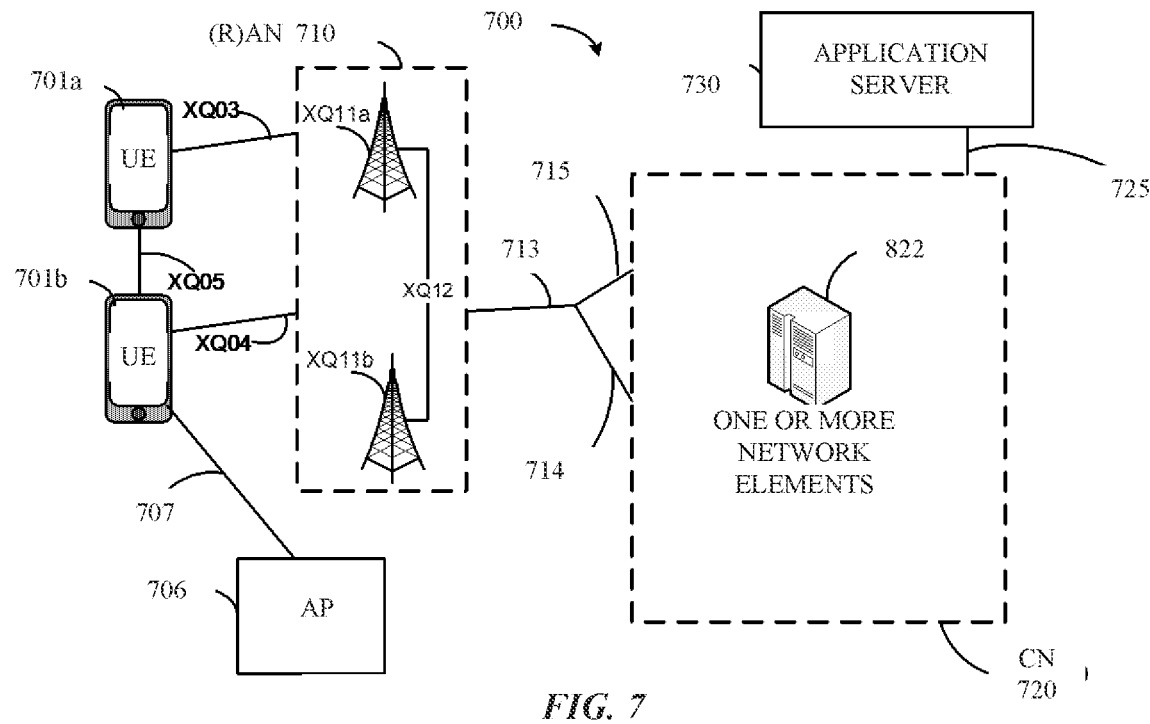
FIG. 7 illustrates an example communication network, in accordance with various aspects disclosed.

FIG. 7 illustrates an example architecture of a system 700 of a communication network, in accordance with various embodiments. The following description is provided for an example system 700 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 7, the system 700 includes UE 701*a* and UE 701*b* (collectively referred to as "UEs 701" or "UE 701"). In this example, UEs 701 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 701 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 may be configured to connect, for example, communicatively couple, with a RAN 710. In embodiments, the RAN 710 may be an NG RAN or a 5G RAN, an E-UTRAN, or a legacy RAN, such as a UTRAN or GERAN. As used herein, the term "NG RAN" or the like may refer to a RAN 710 that operates in an NR or 5G system 700, and the term "E-UTRAN" or the like may refer to a RAN 710 that operates in an LTE or 4G system 700. The UEs 701 utilize connections (or channels) 703 and 704, respectively, each of which comprises a physical communications interface or layer (discussed in further detail below).

In this example, the connections 703 and 704 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 701 may directly exchange communication data via a ProSe interface 705. The ProSe interface 705 may alternatively be referred to as a SL interface 705 and may comprise one or more logical channels, including but not limited to a PSCCH, a PSSCH, a PSDCH, and a PSBCH.

The UE 701b is shown to be configured to access an AP 706 (also referred to as "WLAN node 706," "WLAN 706," "WLAN Termination 706," "WT 706" or the like) via connection 707. The connection 707 can comprise a local wireless connection, such as a connection consistent with any IEEE 802.11 protocol, wherein the AP 706 would comprise a wireless fidelity (Wi-Fi®) router. In this example, the AP 706 is shown to be connected to the Internet without connecting to the core network of the wireless system (described in further detail below). In various embodiments, the UE 701b, RAN 710, and AP 706 may be configured to utilize LWA operation and/or LWIP operation. The LWA operation may involve the UE 701b in RRC_CONNECTED being configured by a RAN node 711a-b to utilize radio resources of LTE and WLAN. LWIP operation may involve the UE 701b using WLAN radio resources (e.g., connection 707) via IPsec protocol tunneling to authenticate and encrypt packets (e.g., IP packets) sent over the connection 707. IPsec tunneling may include encapsulating the entirety of original IP packets and adding a new packet header, thereby protecting the original header of the IP packets.

The RAN 710 can include one or more AN nodes or RAN nodes 711a and 711b (collectively referred to as "RAN nodes 711" or "RAN node 711") that enable the connections 703 and 704. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 711 that operates in an NR or 5G system 700 (for example, a gNB), and the term "E-UTRAN node" or the like may refer to a RAN node 711 that operates in an LTE or 4G system 700 (e.g., an eNB). According to various embodiments, the RAN nodes 711 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

According to various embodiments, the UEs 701 and the RAN nodes 711 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 701 and the RAN nodes 711 may operate using LAA, eLAA, and/or feLAA mechanisms. In these implementations, the UEs 701 and the RAN nodes 711 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 701 RAN nodes 711, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 701, AP 706, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MOOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 701 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 701. The PDCCH carries information about the transport format and resource allocations related to the PDSCH channel, among other things. It may also inform the UEs 701 about the transport format, resource allocation, and HARQ information related to the uplink shared channel. Typically, downlink scheduling (assigning control and shared channel resource blocks to the UE 701*b* within a cell) may be performed at any of the RAN nodes 711 based on channel quality information fed back from any of the UEs 701. The downlink resource assignment information may be sent on the PDCCH used for (e.g., assigned to) each of the UEs 701.

The RAN 710 is shown to be communicatively coupled to a core network—in this embodiment, core network (CN) 720. The CN 720 may comprise a plurality of network elements 722, which are configured to offer various data and telecommunications services to customers/subscribers (e.g., users of UEs 701) who are connected to the CN 720 via the RAN 710. The components of the CN 720 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 720 may be referred to as a network slice, and a logical instantiation of a portion of the CN 720 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 8:
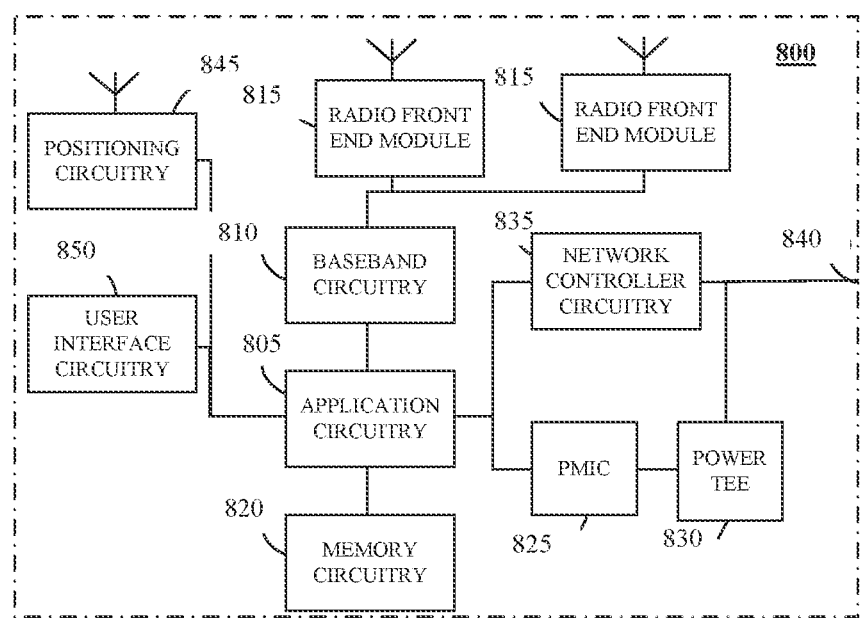
FIG. 8 illustrates an example of a base station (e.g., an infrastructure equipment device, eNB, gNB), in accordance with various aspects disclosed.

FIG. 8 illustrates an example of an infrastructure equipment 800 in accordance with various embodiments. The infrastructure equipment 800 (or "system 800") may be implemented as a base station, radio head, RAN node such as the RAN nodes 711 and/or AP 706 shown and described previously, application server(s) 730, and/or any other element/device discussed herein. In other examples, the system 800 could be implemented in or by a UE.

The system 800 includes application circuitry 805, baseband circuitry 810, one or more radio front end modules (RFEMs) 815, memory circuitry 820, power management integrated circuitry (PMIC) 825, power tee circuitry 830, network controller circuitry 835, network interface connector 840, satellite positioning circuitry 845, and user interface circuitry 850. In some embodiments, the device 800 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 805 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 805 may be coupled with or may include memory/storage elements and may be configured to execute instructions stored in the memory/storage to enable various applications or operating systems to run on the system 800. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 805 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 805 may comprise, or may be, a special-purpose processor/controller to operate according to the various embodiments herein. As examples, the processor(s) of application circuitry 805 may include one or more Apple® processors, Intel® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 800 may not utilize application circuitry 805, and instead may include a special-purpose processor/controller to process IP data received from an EPC or 5GC, for example.

User interface circuitry 850 may include one or more user interfaces designed to enable user interaction with the system 800 or peripheral component interfaces designed to enable peripheral component interaction with the system 800. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The components shown by FIG. 8 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 9:
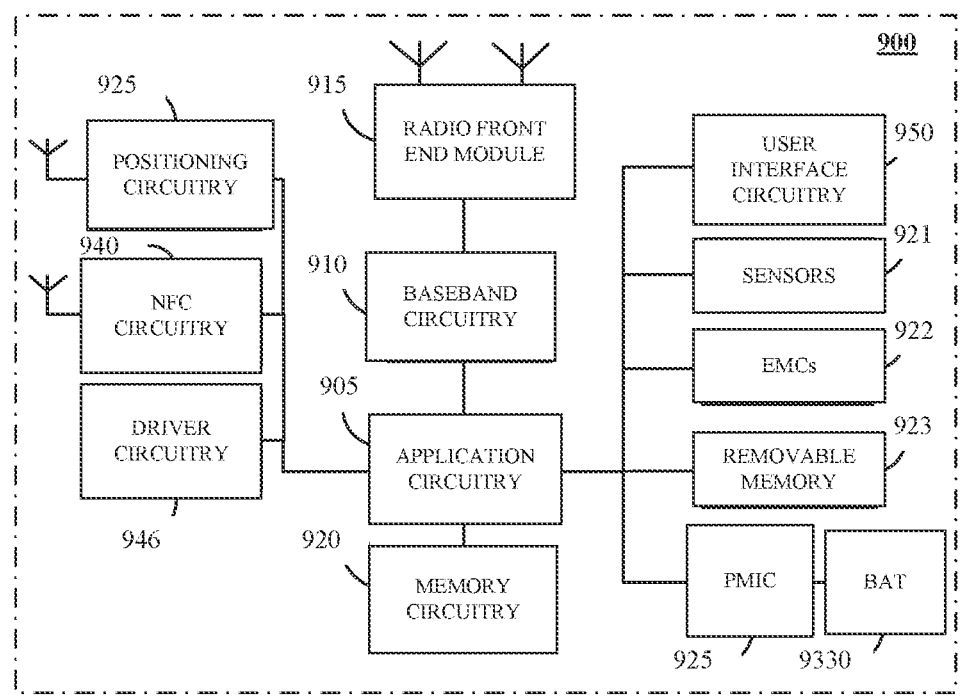
FIG. 9 illustrates an example of a user equipment device (e.g., UE), in accordance with various aspects disclosed.

FIG. 9 illustrates an example of a platform 900 (or "device 900") in accordance with various embodiments. In embodiments, the computer platform 900 may be suitable for use as UEs 101, 701, application servers 730, and/or any other element/device discussed herein. The platform 900 may include any combinations of the components shown in the example. The components of platform 900 may be implemented as integrated circuits (ICs), portions thereof, discrete electronic devices, or other modules, logic, hardware, software, firmware, or a combination thereof adapted in the computer platform 900, or as components otherwise incorporated within a chassis of a larger system. The block diagram of FIG. 9 is intended to show a high level view of components of the computer platform 900. However, some of the components shown may be omitted, additional components may be present, and different arrangement of the components shown may occur in other implementations.

Application circuitry 905 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 905 may be coupled with or may include memory/storage elements and may be configured to execute instructions stored in the memory/storage to enable various applications or operating systems to run on the system 900. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

As examples, the processor(s) of application circuitry 905 may include a general or special purpose processor, such as an A-series processor (e.g., the A13 Bionic), available from Apple® Inc., Cupertino, CA or any other such processor. The processors of the application circuitry 905 may also be one or more of Advanced Micro Devices (AMD) Ryzen® processor(s) or Accelerated Processing Units (APUs); Core processor(s) from Intel® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 905 may be a part of a system on a chip (SoC) in which the application circuitry 905 and other components are formed into a single integrated circuit, or a single package.

The baseband circuitry 910 may be implemented, for example, as a solder-down substrate including one or more integrated circuits, a single packaged integrated circuit soldered to a main circuit board or a multi-chip module containing two or more integrated circuits.

The platform 900 may also include interface circuitry (not shown) that is used to connect external devices with the platform 900. The external devices connected to the platform 900 via the interface circuitry include sensor circuitry 921 and electro-mechanical components (EMCs) 922, as well as removable memory devices coupled to removable memory circuitry 923.

A battery 930 may power the platform 900, although in some examples the platform 900 may be mounted deployed in a fixed location, and may have a power supply coupled to an electrical grid. The battery 930 may be a lithium ion battery, a metal-air battery, such as a zinc-air battery, an aluminum-air battery, a lithium-air battery, and the like. In some implementations, such as in V2X applications, the battery 930 may be a typical lead-acid automotive battery.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or examples of the disclosure herein. Also, one or more of the acts depicted herein may be carried out in one or more separate acts and/or phases. In some examples, the methods illustrated above may be implemented in a computer readable medium using instructions stored in a memory. Many other examples and variations are possible within the scope of the claimed disclosure.

EXAMPLES

Example 1 is an apparatus for a user equipment (UE), including one or more processors configured to cause the UE to: determine a set of preconfigured random access channel (RACH) occasions (ROs), wherein the set of preconfigured ROs includes a plurality of successive ROs; derive a set of adjusted ROs by inserting a time gap between ROs in the set of preconfigured ROs; and transmit a physical random access channel (PRACH) preamble in at least one adjusted RO in the set of adjusted ROs.

Example 2 includes the subject matter of example 1, including or omitting optional elements, wherein the one or more processors are configured to cause the UE to derive the set of adjusted ROs by inserting a time gap having a predetermined duration between one or more successive ROs in the set of preconfigured ROs.

Example 3 includes the subject matter of example 2, including or omitting optional elements, wherein the predetermined duration includes a predetermined number of symbols.

Example 4 includes the subject matter of example 2, including or omitting optional elements, wherein the predetermined duration includes a predetermined time duration.

Example 5 includes the subject matter of example 2, including or omitting optional elements, wherein the predetermined duration includes a predetermined integer multiple of an RO duration.

Example 6 includes the subject matter of example 1, including or omitting optional elements, wherein the one or more processors are configured to cause the UE to derive the set of adjusted ROs by deactivating one or more ROs in the set of preconfigured ROs.

Example 7 includes the subject matter of example 1, including or omitting optional elements, wherein the one or more processors are configured to cause the UE to derive the set of adjusted ROs by inserting or extending a guard period of the PRACH preamble.

Example 8 includes the subject matter of example 1, including or omitting optional elements, wherein the one or more processors are configured to cause the UE to derive the set of adjusted ROs by puncturing a repeated sequence of the PRACH preamble.

Example 9 includes the subject matter of any one of examples 1-8, including or omitting optional elements, wherein the one or more processors are configured to cause the UE to derive the set of adjusted ROs based on one a listen-before-talk (LBT) parameter received in higher layer signaling.

Example 10 includes the subject matter of any one of examples 1-8, including or omitting optional elements, wherein the one or more processors are configured to cause the UE to implicitly derive the set of adjusted ROs based on one or more parameters received in higher layer signaling.

Example 11 includes the subject matter of any one of examples 1-8, including or omitting optional elements, wherein the one or more processors are configured to cause the UE to determine as invalid ROs in the set of adjusted ROs that occur outside a predetermined RACH slot.

Example 12 includes the subject matter of any one of examples 1-8, including or omitting optional elements, wherein the one or more processors are configured to cause the UE to shift a first RO in the set of adjusted ROs by a shifting offset based on a length of an expected PRACH transmission of a different UE.

Example 13 includes the subject matter of any one of examples 1-8, including or omitting optional elements, wherein the one or more processors are configured to cause the UE to perform an LBT process prior to transmitting the PRACH preamble.

Example 14 is a method, including, at a user equipment (UE): determining a set of preconfigured random access channel (RACH) occasions (ROs), wherein the set of preconfigured ROs includes a plurality of successive ROs; deriving an set of adjusted ROs by inserting a time gap between ROs in the set of preconfigured ROs; and transmitting a physical random access channel (PRACH) preamble in at least one adjusted RO in the set of adjusted ROs.

Example 15 includes the subject matter of example 14, including or omitting optional elements, including deriving the set of adjusted ROs by inserting a time gap having a predetermined duration between one or more successive ROs in the set of preconfigured ROs.

Example 16 includes the subject matter of example 14, including or omitting optional elements, including deriving the set of adjusted ROs by deactivating one or more ROs in the set of preconfigured ROs.

Example 17 includes the subject matter of example 14, including or omitting optional elements, including deriving the set of adjusted ROs by modifying the PRACH preamble.

Example 18 includes the subject matter of any one of examples 14-17, including or omitting optional elements, including deriving the set of adjusted ROs based on one or more parameters received in higher layer signaling.

Example 19 includes the subject matter of any one of examples 14-17, including or omitting optional elements, including shifting a first RO in the set of adjusted ROs by a shifting offset based on a length of an expected PRACH transmission of a different UE.

Example 20 is a method, including, at a base station: determining a set of preconfigured random access channel (RACH) occasions (ROs), wherein the set of preconfigured ROs includes a plurality of successive ROs; deriving an set of adjusted ROs by inserting a time gap between ROs in the set of preconfigured ROs; and receiving a physical random access channel (PRACH) preamble in at least one adjusted RO in the set of adjusted ROs.

Example 21 includes the subject matter of example 20, including or omitting optional elements, including deriving the set of adjusted ROs by inserting a time gap having a predetermined duration between one or more successive ROs in the set of preconfigured ROs.

Example 22 includes the subject matter of example 20, including or omitting optional elements, including deriving the set of adjusted ROs by deactivating one or more ROs in the set of preconfigured ROs.

Example 23 includes the subject matter of example 20, including or omitting optional elements, including deriving the set of adjusted ROs by modifying the PRACH preamble.

Example 24 includes the subject matter of any one of examples 20-23, including or omitting optional elements, including shifting a first RO in the set of adjusted ROs by a shifting offset based on a length of an expected PRACH transmission of a UE.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A user equipment (UE), comprising a memory and one or more processors configured to, when executing instructions stored in the memory, cause the UE to:
receive configuration of a set of preconfigured random access channel (RACH) occasions (ROs), wherein the configuration indicates a plurality of successive ROs and comprises higher layer signaling of a prach-ConfigurationIndex value that indicates one of a plurality of physical random access channel (PRACH) configurations, wherein the plurality of PRACH configurations include respective indications of a scaling factor that indicates a number of ROs to deactivate to derive a time gap; and
when operating in unlicensed spectrum,
determine the time gap based on the scaling factor;
derive a set of adjusted ROs by inserting the time gap between ROs in the plurality of successive ROs; and
transmit a PRACH preamble in at least one adjusted RO in the set of adjusted ROs.

2. The UE of claim 1, wherein the one or more processors are configured to cause the UE to derive the set of adjusted ROs by inserting the time gap between one or more of the plurality of successive ROs.

3. The UE of claim 1, wherein the one or more processors are configured to cause the UE to implicitly derive the set of adjusted ROs without receiving further configuration of ROs.

4. The UE of claim 1, wherein the one or more processors are configured to cause the UE to determine as invalid ROs in the set of adjusted ROs that occur outside a predetermined RACH slot.

5. The UE of claim 1, wherein the one or more processors are configured to cause the UE to shift a first RO in the set of adjusted ROs by a shifting offset based on a length of an expected PRACH transmission of a different UE.

6. The UE of claim 1, wherein the one or more processors are configured to cause the UE to perform an LBT process prior to causing transmission of the PRACH preamble.

7. A baseband processor configured to, when executing instructions stored in a memory, perform operations comprising:
receiving configuration of a set of preconfigured random access channel (RACH) occasions (ROs), wherein the configuration indicates a plurality of successive ROs and comprises higher layer signaling of a prach-ConfigurationIndex value that indicates one of a plurality of PRACH configurations, wherein the plurality of physical random access channel (PRACH) configurations include respective indications of a scaling factor that indicates a number of ROs to deactivate to derive a time gap; and
when operating in unlicensed spectrum,
determining the time gap based on the scaling factor;
deriving a set of adjusted ROs by inserting the time gap between ROs in the plurality of successive ROs; and
causing transmission of a PRACH preamble in at least one adjusted RO in the set of adjusted ROs.

8. The baseband processor of claim 7, wherein the operations comprise deriving the set of adjusted ROs by inserting the time gap between one or more of the plurality of successive ROs in the set of preconfigured ROs.

9. The baseband processor of claim 7, wherein the operations comprise deriving the set of adjusted ROs without receiving further configuration of ROs.

10. The baseband processor of claim 7, wherein the operations comprise shifting a first RO in the set of adjusted ROs by a shifting offset based on a length of an expected PRACH transmission of a different UE.

11. A baseband processor configured to perform operations comprising:
deriving a set of adjusted ROs for receiving a physical random access channel (PRACH) preamble from a user equipment (UE) based on configuration of a set of preconfigured random access channel (RACH) occasions (ROs) for the UE, wherein the configuration indicates a plurality of successive ROs and comprises higher layer signaling of a prach-ConfigurationIndex value that indicates one of a plurality of physical random access channel (PRACH) configurations, wherein the plurality of PRACH configurations include respective indications of a scaling factor that indicates a number of ROs to deactivate to derive a time gap; and
when the UE is operating in unlicensed spectrum,
receiving a PRACH preamble in at least one adjusted RO in a set of adjusted ROs that includes the time gap between successive ROs.

12. The baseband processor of claim 11, wherein the operations comprise deriving the set of adjusted ROs by inserting the time gap between one or more of the plurality of successive ROs.

13. The baseband processor of claim 11, wherein the operations comprise shifting a first RO in the set of adjusted ROs by a shifting offset based on a length of an expected PRACH transmission of a UE.

* * * * *